US007698085B2

(12) United States Patent  (10) Patent No.: US 7,698,085 B2
Nhusomkaew et al.  (45) Date of Patent: Apr. 13, 2010

(54) HEAD STACK ASSEMBLY GRAMLOAD PROCESS CAPABILITY IMPROVEMENT

(75) Inventors: Subin Nhusomkaew, Prachinburi (TH); Winai Sittinancharoen, Chachoengsa (TH)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 75 days.

(21) Appl. No.: 12/170,586

(22) Filed: Jul. 10, 2008

(65) Prior Publication Data

US 2010/0007977 A1 Jan. 14, 2010

(51) Int. Cl.
G01L 1/00 (2006.01)
G06F 19/00 (2006.01)
(52) U.S. Cl. .................................................... 702/105
(58) Field of Classification Search ................. 702/105, 702/41, 43, 101, 102, 113, 115, 138, 173, 702/174; 360/234.6, 234.7, 244.2, 245.4, 360/245.5
See application file for complete search history.

(56) References Cited

U.S. PATENT DOCUMENTS

| 5,297,413 | A | | 3/1994 | Schones et al. |
| 5,459,921 | A | | 10/1995 | Hudson et al. |
| 5,637,807 | A | * | 6/1997 | Kliewer et al. ......... 73/862.541 |
| 5,787,570 | A | | 8/1998 | Ressmeyer et al. |
| 5,832,763 | A | | 11/1998 | Girard |
| 5,832,764 | A | | 11/1998 | Girard |
| 5,842,270 | A | * | 12/1998 | Tucker et al. ................. 29/705 |
| 5,870,254 | A | * | 2/1999 | Baserman et al. ........ 360/244.6 |
| 5,943,761 | A | * | 8/1999 | Tucker et al. ............ 29/603.03 |
| 5,991,114 | A | | 11/1999 | Huang et al. |
| 6,002,552 | A | | 12/1999 | Leung |
| 6,011,239 | A | | 1/2000 | Singh et al. |
| 6,063,508 | A | | 5/2000 | Hanrahan et al. |
| 6,072,151 | A | | 6/2000 | Jurgenson et al. |
| 6,307,719 | B1 | | 10/2001 | Mallary |
| 6,512,657 | B2 | | 1/2003 | Heist et al. |
| 6,711,929 | B2 | | 3/2004 | Yamaguchi et al. |
| 7,068,470 | B1 | | 6/2006 | Hadian et al. |
| 7,082,670 | B2 | | 8/2006 | Boismier et al. |
| 7,275,408 | B1 | * | 10/2007 | Balasubramaniam et al. ........................ 72/342.1 |
| 7,352,530 | B2 | * | 4/2008 | Fong et al. ................ 360/234.6 |
| 2004/0016277 | A1 | | 1/2004 | Thaveeprungsriporn |
| 2006/0203393 | A1 | | 9/2006 | Fong et al. |

OTHER PUBLICATIONS

Singh, et al., "Laser Gram Load Adjust for Improved Disk Drive Performance," *IEEE Transactions on Magnetics*, vol. 37, No. 2, (Mar. 2001), 959-963.
Prior Art Database, et al., "Rotary Head Lifter for Head Stack Assembly Gramload Tester," http://www.priorartdatabase.com/IPCOM/000123700/, (Aug. 28, 2007), 1-1.

* cited by examiner

*Primary Examiner*—Michael P. Nghiem
*Assistant Examiner*—Cindy H Khuu

(57) ABSTRACT

A method for measuring a gramload corresponding to a read/write head, where the head is an inner head of a plurality of heads in a head stack assembly (HSA), involves a measurement instrument having a plurality of cam-rods for systematically placing each of various heads in a preloaded state in order to measure the respective gramload of the heads. While an inner head's gramload is being measured, an adjacent inner head is configured in a supported state, and the cam-rod corresponding to the supported head transmits some additional force to the head whose gramload is being measured, e.g., via a common support arm for the adjacent inner heads. Therefore, this additional applied force is compensated for in order to provide more accurate gramload values.

8 Claims, 4 Drawing Sheets

HEAD STACK ASSEMBLY GRAMLOAD PROCESS CAPABILITY IMPROVEMENT

TECHNICAL FIELD

Embodiments of the invention relate generally to the field of hard drives and, more specifically, to a head stack assembly (HSA) gramload process capability improvement.

BACKGROUND ART

Electronic computing devices have become increasingly important to data computation, analysis and storage in our modern society. Modern direct access storage devices (DASDs), such as hard disk drives (HDDs), are heavily relied on to store mass quantities of data for purposes of future retrieval. As such long term data storage has become increasingly popular, and as the speed of microprocessors has steadily increased over time, the need for HDDs with greater storage capacity to store the increased amount of data has also steadily increased.

Consequently, there are seemingly constant development efforts to improve the areal density of the media implemented in hard disk drives, where the areal density is typically measured as the product of bits per inch ("BPI") and tracks per inch ("TPI"). BPI refers to the number of bits that can be written and later reread per linear inch along a track, whereas TPI refers to the number of individual tracks per radial inch.

HDDs are configured with read/write heads, supported on air bearing sliders (ABS), for reading data from and writing data to rotating disks. One distinguishing characteristic of hard disk technology that makes it different from how floppy disks, VCRs and tape decks operate, is that the read/write heads are typically not designed to make contact with the media during read and write operations. Essentially, the reason for this is that due to the high speed at which the disks spin, and the need for the heads to frequently scan from side to side to different tracks, allowing the heads to contact the disk would result in unacceptable wear to both the delicate heads and the media.

Fly Height

A typical air bearing slider floats over the surface of the disk during read and write operations such that the head does not physically touch the corresponding disk. The amount of space between a head and a corresponding disk is called the "flying height" or "fly height". The slider assemblies are spring-loaded, using the spring characteristic of the corresponding suspension or arm (i.e., a suspension preload), which causes the slider on which the head is coupled to press against the disk when the disk is stationary. When the disk spins up to operating speed, the high speed causes air to flow under the sliders and lift them off the surfaces of the disk. The spring load of a given slider is characterized by the "gramload" corresponding to the slider.

The term "gramload" generally refers to the spring load of the entire suspension and slider assembly but nevertheless may be referred to as "head gramload" or simply "gramload." Gramloads are a characteristic of an HDD that is typically adjustable during manufacturing, e.g., to compensate for fly height deviations caused by slider crown, camber, etch depths, tolerances, etc. However, in order to accurately adjust the gramloads to compensate for fly height design deviations, one has to accurately measure the gramload of each head. Instruments exist for measuring gramload, however there are issues with their accuracy.

SUMMARY OF EMBODIMENTS OF THE INVENTION

A method for measuring a gramload corresponding to a read/write head is described, where the head is an inner head of a plurality of heads in a head stack assembly (HSA). A measurement instrument comprises a plurality of cam-rods for systematically placing each of the various read/write heads in a preloaded state in order to measure the respective gramload of the head, e.g., by rotating a corresponding cam-rod to a 90° configuration. While an inner head's gramload is being measured, an adjacent inner head is configured in a supported state, e.g., by rotating a corresponding cam-rod to a 0° configuration.

It was discovered that when using the measurement instrument to place one inner head in a preloaded state (the head being measured) while placing an adjacent inner head, which is coupled to a common actuator arm with the inner head being measured, in a supported state (a head not being measured), the cam-rod corresponding to the head not being measured actually transmits some additional force to the head whose gramload is being measured, e.g., via the common arm. Therefore, according to an embodiment of the invention, this additional applied force is compensated for in order to provide a more accurate gramload value. That is, an actual gramload corresponding to the head being measured is determined by computing the difference between a measured gramload and the additional force applied by the cam-rod.

BRIEF DESCRIPTION OF THE DRAWINGS

The accompanying drawings, which are incorporated in and form a part of this specification, illustrate embodiments of the invention and, together with the description, serve to explain the principles of the invention. The drawings are used merely to illustrate principles of the illustrated embodiments, and it is understood that components described in these embodiments have not been drawn to scale.

DETAILED DESCRIPTION OF EMBODIMENTS OF THE INVENTION

Figure 1:
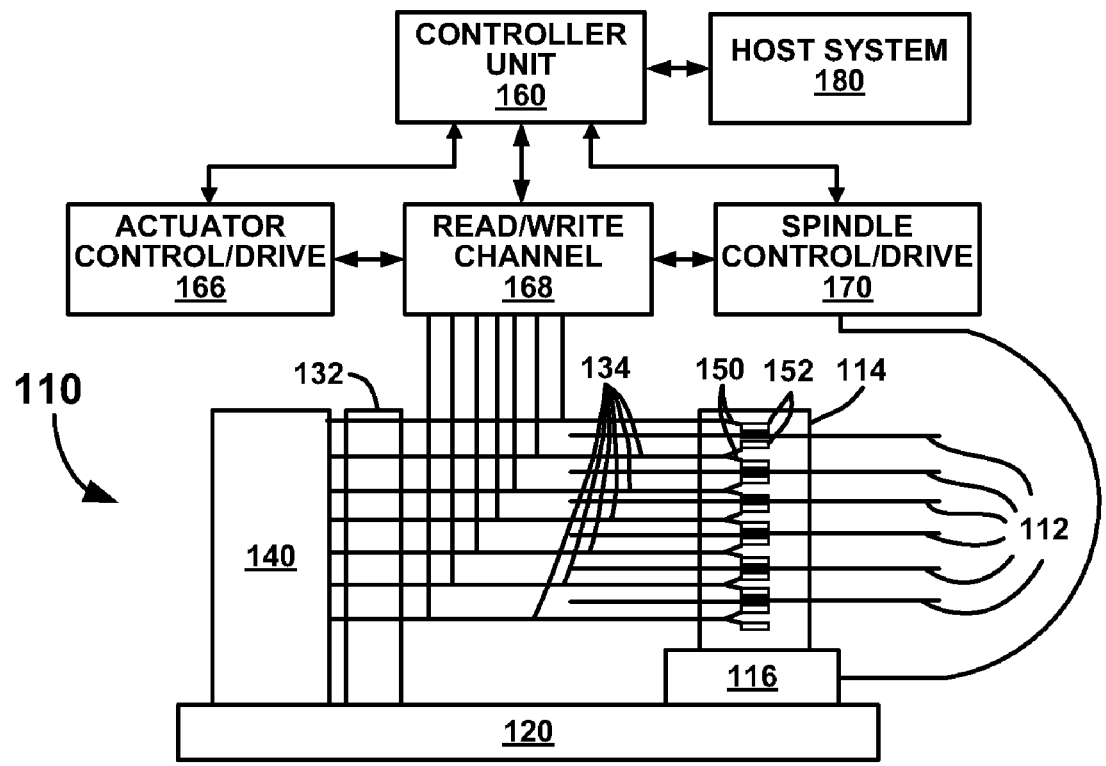
FIG. 1 illustrates a side view of a disk drive system, according to an embodiment of the invention.

Reference will now be made in detail to embodiments of the present technology, examples of which are illustrated in the accompanying drawings. While the technology will be described in conjunction with various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Overview

Embodiments of the invention include a method for measuring a gramload corresponding to a read/write head, where the head is an inner head of a plurality of heads in a head stack assembly (HSA). Note that for simplicity, gramload is generally referred to in the context of a head but is more accurately a characteristic of the entire suspension and air bearing slider assemblies, which includes the head. A measurement instrument includes a plurality of cam-rods for systematically placing each of the various read/write heads in a preloaded state in order to measure the respective gramload of the head. While an inner head's gramload is being measured, an adjacent inner head is configured in a supported state. It was discovered that when using the measurement instrument to place one inner head in a preloaded state (the head being measured) while placing an adjacent inner head, which is coupled to a common actuator arm with the inner head being measured, in a supported state (a head not being measured), the cam-rod corresponding to the head not being measured actually transmits some additional force to the head whose gramload is being measured, e.g., via the common arm.

According to an embodiment of the invention, the additional force applied by the adjacent cam-rod is compensated for, thereby providing a more accurate gramload value for the head whose gramload is being measured. That is, an actual gramload corresponding to an inner head is determined by subtracting out the additional force, applied by the adjacent cam-rod, from the measured gramload for that head. According to an embodiment, the foregoing "gramload compensation" method is embodied in computer code, e.g., computer software or firmware. That is, the gramload compensation method may be implemented in a computer-readable medium storing sequences of instructions which, when executed by a processor, compensate for the additional applied force in the gramload measurement process. For example, such instructions may be executable by a processor constituent to a general purpose computer or a special purpose computer programmed to perform the disclosed embodiment, such as a gramload measurement instrument.

It should be understood by those skilled in the art that various embodiments of the invention increase the accuracy of HSA gramload measurement. One non-limiting and important benefit of compensating for the applied force from the adjacent cam-rod is that one can now more accurately compute, based on the actual gramload, a process capability index associated with the gramloads corresponding to a plurality of read-write heads. Stated more generally, more heads will meet corresponding design and/or manufacturing specifications, e.g., with respect to head gramload, when more accurate gramload data is determined and utilized in process capability computations.

Numerous specific embodiments will now be set forth in detail to provide a more thorough understanding of the present technology. The discussion of these detailed embodiments will begin with an overview of a hard disk drive (HDD), and the components connected therein, according to embodiments of the invention. The discussion will then focus on embodiments of the invention involving a method for measuring a gramload corresponding to a read/write head, and related implementations of such method.

Although embodiments of the present invention will be described in conjunction with a magnetic read/write head in a hard disk drive device, it is understood that the embodiments described herein are useful outside of the art of HDD design, manufacturing and operation. The utilization of the HDD magnetic read/write head example is only one embodiment and is provided herein merely for purposes of brevity and clarity.

Hard Disk Drive (HDD) Configuration

Figure 2:
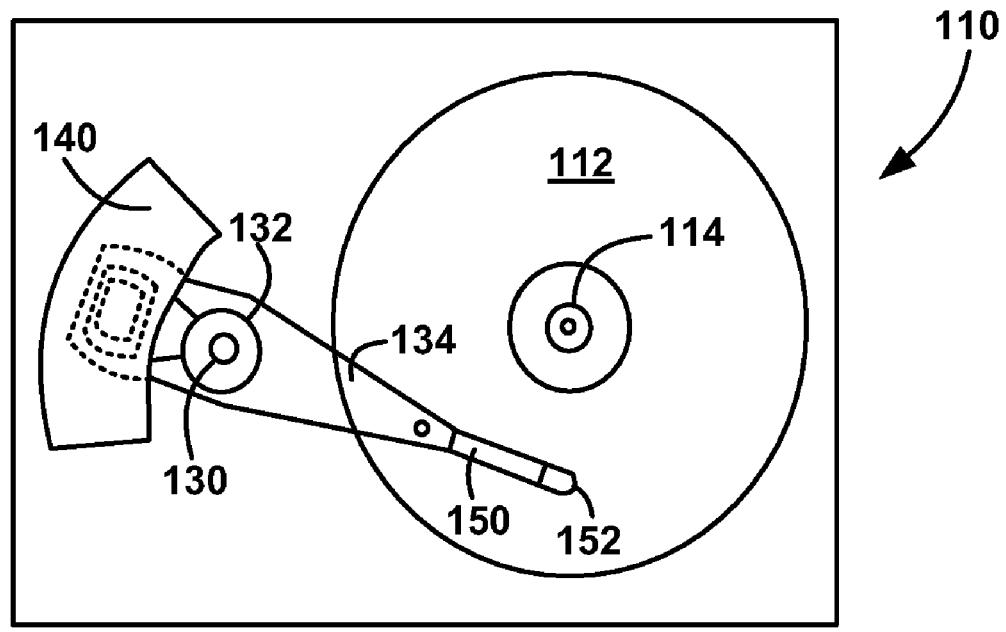
FIG. 2 illustrates a top view of a disk drive system, according to an embodiment of the invention.

FIG. 1 and FIG. 2 show a side view and a top view, respectively, of a disk drive system designated by the general reference number 110. The disk drive system 110 comprises a plurality of stacked magnetic recording disks 112 mounted to a spindle 114. The disks 112 may be conventional thin film recording disks or other magnetically layered disks. The spindle 114 is attached to a spindle motor 116, which rotates the spindle 114 and disks 112. A chassis 120 provides a housing for the disk drive system 110. The spindle motor 116 and an actuator shaft 130 are attached to the chassis 120. A hub assembly 132 rotates about the actuator shaft 130 and supports a plurality of actuator arms 134. A rotary voice coil motor 140 is attached to chassis 120 and to a rear portion of the actuator arms 134.

A plurality of suspension assemblies 150 are attached to the actuator arms 134. A plurality of heads or transducers on sliders 152 are attached respectively to the suspension assemblies 150. The sliders 152 are located proximate to the disks 112 so that, during operation, the heads or transducers are in electromagnetic communication with the disks 112 for reading and writing. The rotary voice coil motor 140 rotates actuator arms 134 about the actuator shaft 130 in order to move the suspension assemblies 150 to the desired radial position on disks 112. The shaft 130, hub assembly 132, actuator arms 134, and voice coil motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller unit 160 is connected to an actuator control/drive unit 166 that in turn is connected to the rotary voice coil motor 140. This configuration also allows controller 160 to control rotation of the disks 112. A host system 180, typically a computer system, is connected to the controller unit 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990.

Gramload Measurement Instrument

As discussed, the spring load of a given head is characterized by the gramload corresponding to the head. Head gramloads are a characteristic of an HDD that is typically adjustable during manufacturing, e.g., to compensate for fly height deviations caused by slider crown, camber, etch depths, tolerances, etc.

Instruments used to measure head gramload typically include a plurality of cam-rods for systematically placing each of the various read/write heads in a preloaded state in order to measure the respective gramload of the head. While an inner head's gramload is being measured, an adjacent inner head is configured in a supported state.

Figure 3:
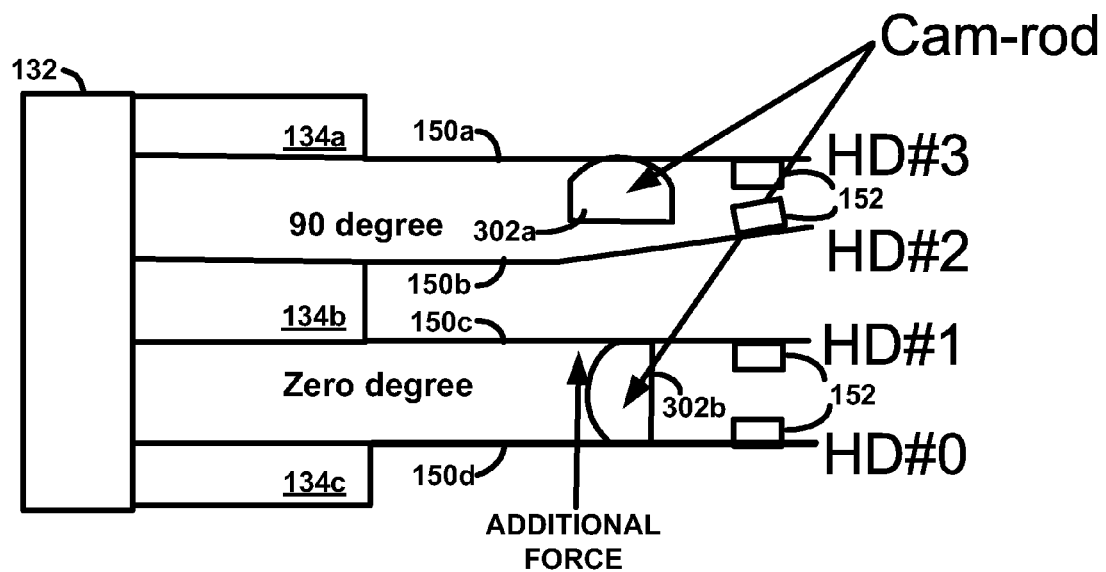
FIG. 3 is a side view of a of an example disk drive system, undergoing a gramload measurement process.

FIG. 3 is a side view of a of an example disk drive system, such as disk drive system 110 (FIGS. 1 and 2), undergoing a gramload measurement process. FIG. 3 illustrates the hub assembly 132 with actuator arms 134a, 134b, 134c coupled thereto. Suspension assembly 150a is coupled with actuator arm 134a, suspension assemblies 150b and 150c are both coupled with actuator arm 134b, and suspension assembly 150c is coupled with actuator arm 134d. Suspension assembly 150a supports a first slider 152 comprising a read/write head ("HD#3"), suspension assembly 150b supports a second slider 152 comprising a read/write head ("HD#2"), suspension assembly 150c supports a third slider 152 comprising a read/write head ("HD#1"), and suspension assembly 150d supports a fourth slider 152 comprising a read/write head ("HD#0"). Note that the number of sliders 152, suspension assemblies 150, and actuator arms 134 may vary from implementation to implementation, and that the number depicted in FIG. 3 is simply an example configuration.

The heads and sliders of primary interest in the following discussion are the sliders 152 comprising heads HD#2 and HD#1, supported by suspension assembly 150b and 150c, respectively. Depicted in FIG. 3 is a measurement configuration in which HD#2 is in a preloaded state, which is a state in which the corresponding gramload is measurable, and in which HD#1 is supported. HD#2 is preloaded through use of a cam-rod 302a in what is referred to herein as a "90 degree position" and HD#1 is supported through use of a cam-rod 302b in what is referred to herein as a "zero degree position". Note that, depending on what is considered the baseline position, cam-rod 302a could be referred to as the "zero degree position" while cam-rod 302b could be referred to as the "90 degree position".

It was discovered that when using the measurement instrument to place one inner head in a preloaded state (e.g., HD#2) while placing an adjacent inner head in a supported state (e.g., HD#1), the cam-rod (e.g., cam-rod 302b) corresponding to the head not being measured (e.g., HD#1) actually transmits some additional force to the head whose gramload is being measured (e.g., HD#2). This additional force is generally applied from cam-rod 302b to head HD#2 by way of the common actuator arm 134b. Similarly (but not depicted in FIG. 3), when using the measurement instrument to place another inner head in a preloaded state (e.g., HD#1) while placing an adjacent inner head in a supported state (e.g., HD#2), the cam-rod (e.g., cam-rod 302a) corresponding to the head not being measured (e.g., HD#2) actually transmits some additional force to the head whose gramload is being measured (e.g., HD#1).

Method for Measuring Gramload

According to an embodiment of the invention, the additional force applied to a head by the adjacent cam-rod is compensated for, thereby providing a more accurate gramload value for the head. That is, an actual gramload corresponding to an inner head is determined by subtracting out the additional force, applied by the adjacent cam-rod, from the measured gramload for that head.

Figure 4:
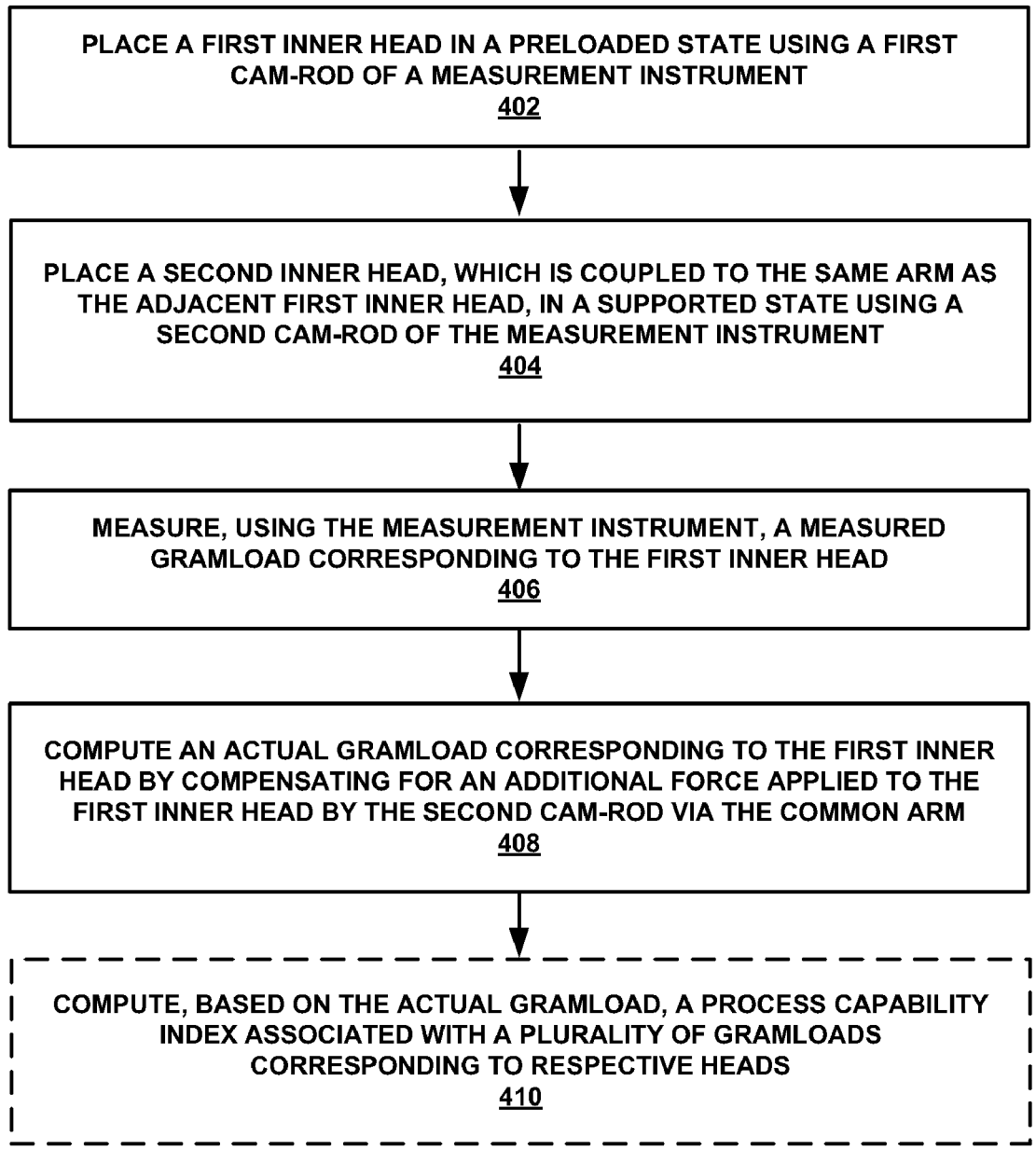
FIG. 4 is a flowchart illustrating a method for measuring a gramload corresponding to a read/write head, according to an embodiment of the invention.

FIG. 4 is a flowchart illustrating a method for measuring a gramload corresponding to a read/write head, according to an embodiment of the invention. As mentioned, the term "gramload" generally refers to the spring load of the entire suspension and slider assembly but nevertheless may be referred to as "head gramload" or simply "gramload." The method depicted in FIG. 4 is practiced in an environment in which there is a measurement instrument comprising a plurality of cam-rods for placing heads in preloaded and supported states, such as described herein in reference to FIG. 3. Note that practice of this embodiment of the invention is not limited strictly to use with a measurement instrument comprising cam "rods", rather, the measurement may comprise another type of configuration that operates similarly to place heads in preloaded and supported states, such as a cam pin, bar, and the like.

The head for which the corresponding gramload is being measured according to this embodiment is an inner head of a plurality of heads constituent to a head stack assembly (HSA). An inner head (e.g., HD#2 and HD#1 of FIG. 3) refers to any head that is not one of the two outer heads (e.g., HD#3 and HD#0 of FIG. 3). The method is in the context of measuring gramload of an inner head because the inner heads are the heads that, in some HSAs, share a common arm (e.g., actuator arm 134b of FIG. 3) for support, etc.

At block 402, a first inner head (i.e., the head whose gramload is presently being measured) is placed in a preloaded state using a first cam-rod constituent to the measurement instrument. For example with reference to FIG. 3, head HD#2 is placed in a preloaded state by moving cam-rod 302a to a 90 degree, or otherwise non-supporting, position.

At block 404, a second inner head (i.e., the head whose gramload is not presently being measured) is placed in a supported state using a second cam-rod constituent to the measurement instrument. Recall that the first and second inner heads are coupled via a common arm. For example with reference to FIG. 3, head HD#1 is placed in a supported state by moving cam-rod 302b to a zero degree, or otherwise supporting, position. As described herein, such a cam-rod configuration results in an additional force being applied to the head being measured. For example with reference to FIG. 3, cam-rod 302b applies an additional force to HD#2 via the common actuator arm 134b. Consequently, this additional force affects the measured gramload value of HD#2, e.g., adds to the measured gramload.

At block 406, a measured gramload value for the first inner head is measured using the measurement instrument. For example, typical gramload measurement instruments digitally display the measured gramload value for the head that is configured in the preloaded (i.e., spring-loaded) state. Continuing with the example, the gramload corresponding to head HD#2 is measured using the measurement instrument.

At block 408, an actual gramload corresponding to the first inner head is determined by compensating for the additional force applied by the second cam-rod via the common arm. For example with reference to FIG. 3, a correction or compensation factor is applied to the measured gramload value for head #2 in order to compute a more accurate actual gramload value for head HD#2. According to an embodiment, this actual gramload value is computed via execution of one or more sequences of instructions by one or more processors. According to an embodiment, compensating for the additional force applied by the second cam-rod comprises computing the difference between the measured gramload corresponding to the first inner head (measured at block 406) and the additional force applied by the second cam-rod.

According to an embodiment, the additional force used to determine the actual gramload is input to a machine-executable routine via an input mechanism. For non-limiting examples, the additional force may be input into a software program or routine using a graphical user interface, a command line interface, an importation function, and the like. Likewise, if the method illustrated in FIG. 4 is embodied in a computer- or machine-executable program or routine, such program or routine is configured to receive an input characterization of the additional force.

Process Capability Index ($C_{pk}$)

"Process capability" compares the output of an in-control process to the specification limits by using capability indices.

For example, the comparison is typically made by forming the ratio of the spread between the process specifications (the specification "width") to the spread of the process values, as measured by six process standard deviation units (the process "width"). To compare the output of a stable process with the process specifications, regarding how well the process meets specification, one can compare the natural variability of a stable process with the process specification limits. A "capable" process is one where almost all the measurements fall inside the specification limits.

At optional (indicated by a dashed block) block 410, according to an embodiment, a process capability index (at times referred to as "$C_{pk}$") associated with a plurality of gramloads that correspond to respective read/write heads is computed, based on the actual gramload corresponding to the first inner head. For example, the actual gramloads of the heads under consideration, rather than the measured gramloads, are used in associated process capability index computations.

Computing the Additional Force

According to an embodiment, the additional force applied by the second cam-rod to an adjacent head is determined. Hence, the determined additional force can be used to compensate the measured gramload to compute the actual gramload, such as at block 408.

One approach to determining an accurate value characterizing the additional force is to use a test HSA manufactured and assembled similarly (e.g., same design and manufacturing process) to the HSAs whose gramloads are being measured. Using this test HSA, the measurement instrument cam-rods 302*a* and 302*b* are used to place heads HD#2 and HD#1 into preloaded and supported states, respectively, as is illustrated in FIG. 3. The gramload for HD#2 is measured using the gramload measurement equipment. Then head HD#1 is removed from the test HSA, and the gramload for HD#2 is again measured using the gramload measurement equipment. Hence, the additional force is computed as the difference between the first measured gramload (with adjacent head in place) and the second measured gramload (with adjacent head removed from the stack), the value of which represents the additional force applied to a preloaded head by an adjacent supporting cam-rod via a common arm.

It should be understood that although various embodiments of the present invention are described in the context of a method for measuring the gramload of a magnetic read/write head associated with a hard disk drive (HDD) device, the foregoing embodiments are merely exemplary of various implementations of principles of the present technology. Therefore, it should be understood that various embodiments of the invention described herein may apply to any devices, configurations, or systems in which read/write heads are employed.

The foregoing descriptions of specific embodiments of the present invention are presented for purposes of illustration and description. They are not intended to be exhaustive or to limit the invention to the precise forms disclosed, and many modifications and variations are possible in light of the above teachings. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for measuring a gramload corresponding to a read/write head, the method comprising:
    using a measurement instrument comprising a cam-rod for placing said read/write head in a preloaded state, wherein said read/write head is a first inner head of a plurality of read/write heads in a head stack assembly and is coupled to a same arm as an adjacent second inner head;
    placing said first inner head in said preloaded state using a first cam-rod;
    placing said second inner head in a supported state using a second cam-rod, wherein said second cam-rod applies an additional force to said first inner head via said arm;
    measuring, using said instrument, a measured gramload corresponding to said first inner head; and
    computing an actual gramload corresponding to said first inner head by compensating for said additional force applied by said second cam-rod.

2. The method recited in claim 1, further comprising:
    computing, based on said actual gramload, a process capability index associated with a plurality of gramloads that correspond to respective read/write heads.

3. The method recited in claim 1, further comprising:
    determining said additional force applied by said second cam-rod.

4. The method recited in claim 3, wherein said head stack assembly is a first head stack assembly, and wherein determining said additional force comprises:
    using a second head stack assembly manufactured and assembled similarly to said first head stack assembly, wherein said second head stack assembly comprises a third inner head and a fourth inner head,
    placing said third inner head in a preloaded state using said first cam-rod;
    placing said fourth inner head in a supported state using said second cam-rod, wherein said second cam-rod applies an additional force to said third inner head via a arm to which both said third and fourth inner heads are coupled;
    measuring, using said instrument, a first measured gramload corresponding to said third inner head;
    removing said fourth inner head from said second head stack assembly;
    measuring, using said instrument, a second measured gramload corresponding to said third inner head; and
    computing said additional force based on the difference between said first measured gramload corresponding to said third inner head and said second measured gramload corresponding to said third inner head.

5. The method recited in claim 3, further comprising:
    inputting to a machine-executable routine a value characterizing said additional force.

6. The method recited in claim 1, wherein compensating for said additional force applied by said second cam-rod comprises computing the difference between said measured gramload corresponding to said first inner head and said additional force applied by said second cam-rod.

7. A computer-readable medium storing one or more sequences of instructions, said instructions which, when executed by one or more processors, cause performance of:
    computing a gramload corresponding to a read/write head, wherein said read/write head is a first inner head of a plurality of read/write heads in a head stack assembly and is coupled to a same arm as an adjacent second inner read/write head, wherein a measurement instrument comprising a cam-rod for placing said read/write head in a preloaded state outputs a measured gramload corresponding to said first inner head;

computing an actual gramload corresponding to said first inner head by computing the difference between said measured gramload corresponding to said first inner head and a force applied by a second cam-rod, of said instrument, which places said second inner head in a supported state while a first cam-rod, of said instrument, places said first inner head in a preloaded state; and outputting said actual gramload corresponding to said first inner head.

8. The computer-readable medium recited in claim 7, wherein said instructions further cause performance of:

receiving a value characterizing said force applied by said second cam-rod.

* * * * *